Aug. 9, 1949.  A. N. SPANEL  2,478,600
METHOD OF DEPOSITING PREFORMED LAYERS OF
LATEX FOAM ON A LATEX FILM
Filed Dec. 6, 1945  2 Sheets-Sheet 1
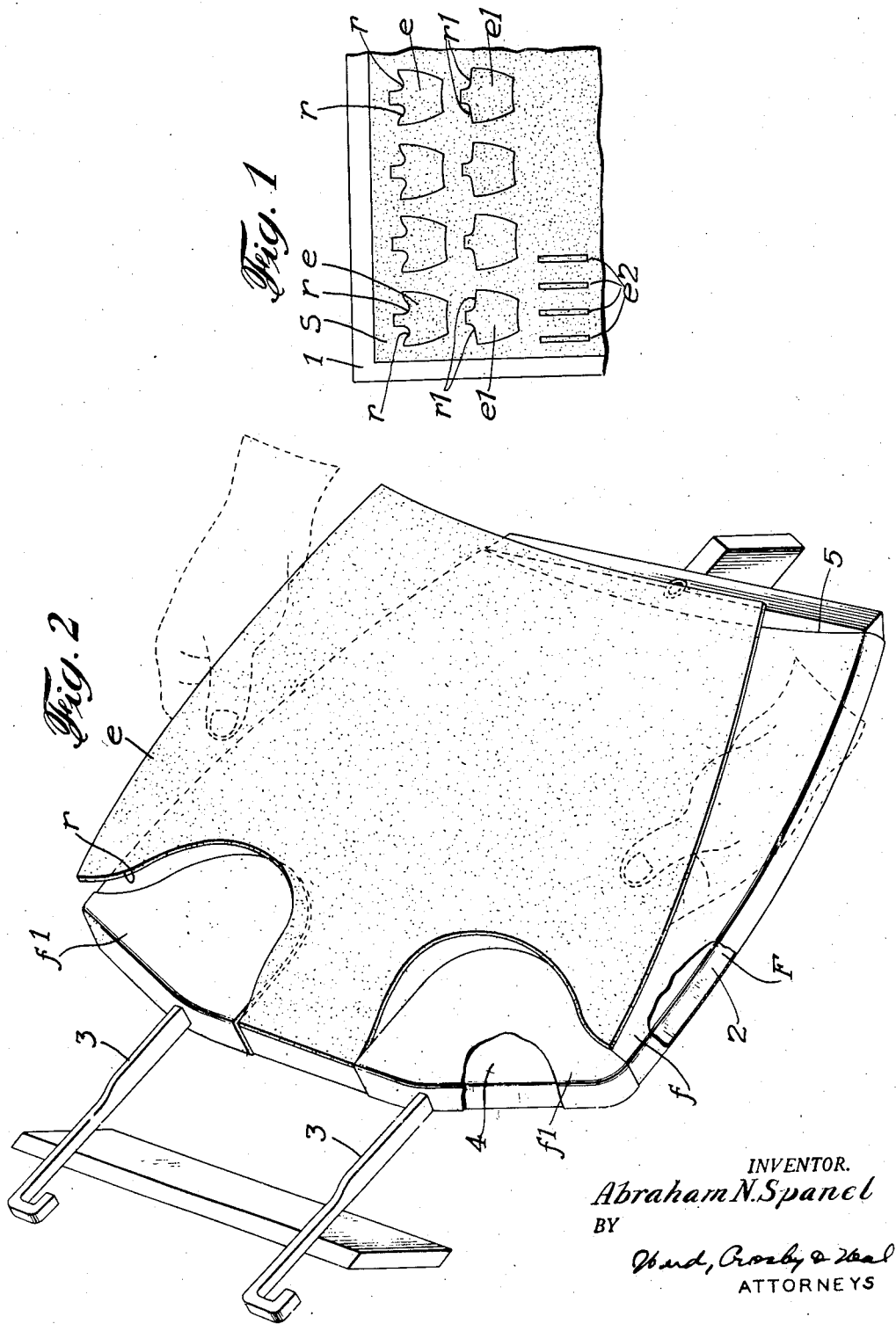
INVENTOR.
Abraham N. Spanel
BY
ATTORNEYS

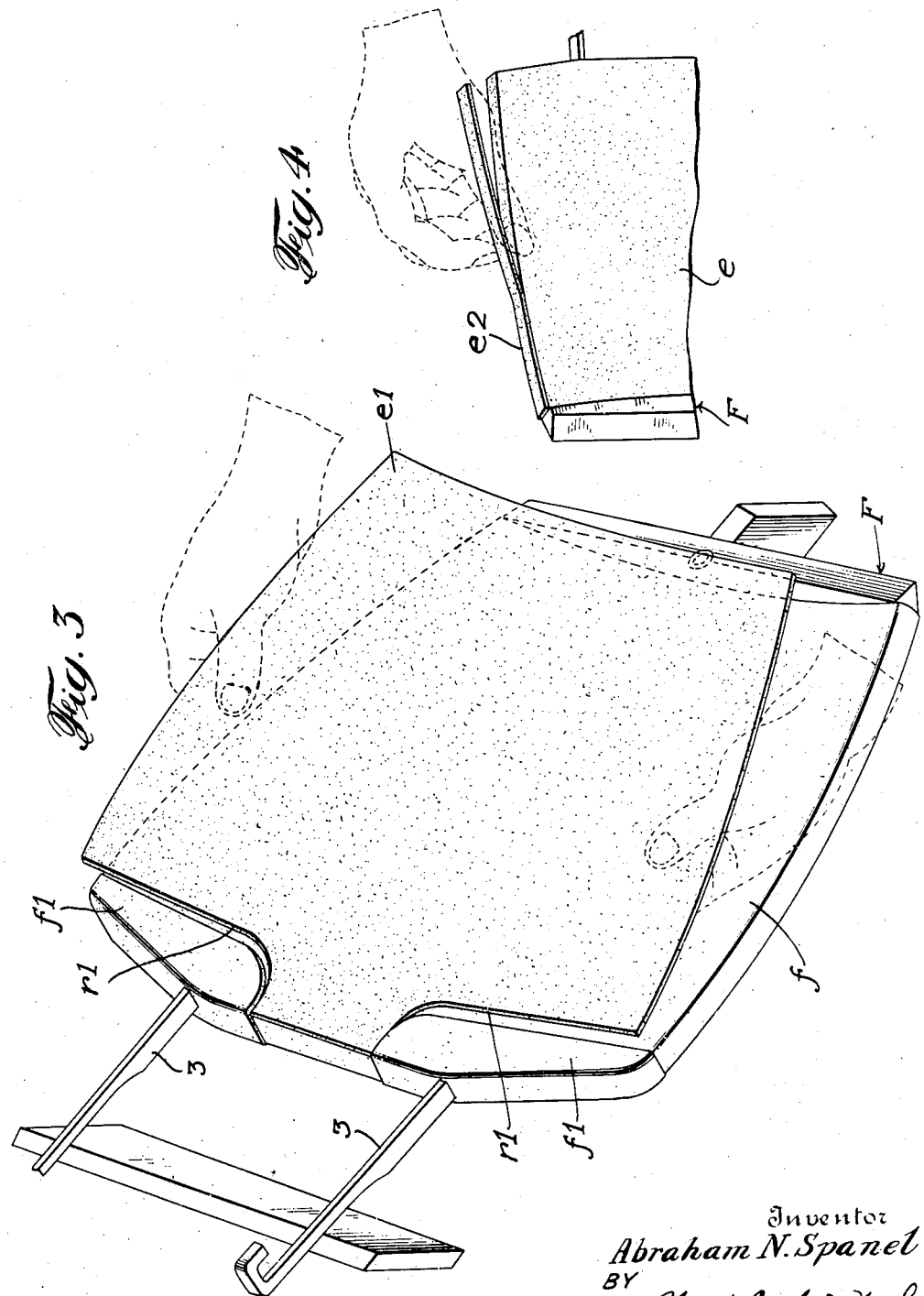

Patented Aug. 9, 1949

2,478,600

UNITED STATES PATENT OFFICE 2,478,600

METHOD OF DEPOSITING PREFORMED LAYERS OF LATEX FOAM ON A LATEX FILM

Abraham N. Spanel, Princeton, N. J.

Application December 6, 1945, Serial No. 633,083

4 Claims. (Cl. 154—139)

My invention relates to preformed layers of latex foam and to the method of producing them. My invention has further reference to the method of applying such preformed layers of latex foam to a latex film in intimately bonded relation. My invention has further reference to the resultant latex article.

Latex articles embodying a rubber or latex film and an adhering coating or covering of latex foam are well known in the art and it is also known that such articles may be produced by dipping a form a suitable number of times first into a liquid latex solution and then into a latex foam solution. In accordance with one phase of the present invention, layers of preformed latex foam are produced in suitable manner and thereafter applied to a rubber or latex film produced by dipping a form into a liquid latex solution as referred to above. In this manner, the latex film is coated or covered with latex foam, this being advantageous for various reasons as will be understood by those skilled in the art.

My invention has further reference to novel methods of forming latex articles, to novel latex articles and preformed layers of latex foam.

Various other objects, advantages and features of the invention will become apparent from the following detailed description.

My invention resides in the method of applying one or more layers of latex foam, preformed or otherwise, on a rubber or latex film, in the resultant article, in the method of producing preformed layers of latex foam and in the layers of preformed latex foam per se.

For an understanding of my invention, reference is to be had to the accompanying drawings, in which:

Figure 1 is a plan view illustrating a step in the method of producing layers of latex foam;

Figs. 2 and 3 are perspective views illustrating the application of a layer of latex foam on sections of a latex film supported by a form; and Fig. 4 is a perspective view illustrating the application of a layer of latex foam on that section of a latex film which engages the side of a form.

In general, my invention has reference to a novel method of producing a latex foam coating. More particularly, the invention relates to a method of producing a rubber or latex article embodying a rubber or latex film and an adhering coating or covering of latex foam. In accordance with the invention, there may be produced rubber or latex articles of any suitable or desired character such, for example, as girdles, gloves, bathing caps, supports for parts of the human body, etc. For purposes of explanation, I have illustrated and described the invention in connection with the production of a girdle. It shall be distinctly understood, however, that the invention is not to be thus limited since, as stated, various other types of rubber or latex articles may be produced by my novel method as desired.

In accordance with the invention, latex foam of suitable character preferably, however, as disclosed in U. S. Letters Patent 2,321,111 is disposed in a suitable pan or receptacle and then leveled so that it has the proper thickness. Thereupon, after the latex foam has become dry and before complete vulcanization has taken place, it is removed from the pan or receptacle and disposed in sheet form as indicated at S on a plate-like support or carrier I, Fig. 1. At this time, by utilization of the proper tools, suitably shaped latex foam layers, sheets or strips e, e1 and e2 are cut from the latex foam sheet S. These layers, sheets or strips of latex foam may be of such character that complete vulcanization has not taken place or they may be substantially unvulcanized when they are utilized as hereinafter described. They are capable of adhering to a latex or rubber film and hence they are substantially or somewhat tacky.

Referring to Figs. 2, 3 and 4, I have shown a form F utilizable, in the manner hereinafter described, for the production of a girdle. The form F may be of any suitable character such, for example, as illustrated in U. S. Letters Patent No. 2,360,736 and, hence, consists of a plane member 2 formed from metal, or an equivalent material, and having a pair of supporting members 3 secured to the top thereof. As shown, the member 2 has plane front and rear surfaces together with curved sides and, in a known manner, said member 2 comprises bosses or pads 4 defined, respectively, by peripheral sharp edges utilizable as hereinafter described. The member 2 further comprises surfaces 5 adapted, during the dipping operation, to form the reinforced upper girdle surfaces.

As a first step in the production of the girdle, the form F is dipped one or more times in an aqueous dispersion of rubber, either natural or synthetic, which may include numerous well known ingredients better adapting it for dipping purposes, this aqueous dispersion of rubber being hereinafter generically termed a "liquid latex dispersion." After each dipping operation, the deposited film on the form F is dried to a suitable extent and, as a result, there is obtained on the exterior surface of said form F a rubber layer or film $f$ having desired thickness and hereinafter generically termed a "latex film." During the dipping operation, the aforesaid bosses or pads 4 produce raised latex film sections or defined areas $f1$ which are bordered, respectively, by narrow grooves or channels produced by the peripheral sharp edges of the bosses or pads 4, respectively. Accordingly, as well understood in the art, the latex film sections $f1$ may readily be cut or otherwise detached from the main body of the latex film after the latter is stripped from the form F to thereby form leg openings in the lower girdle section. It will thus be understood that the bosses 4 serve as defining areas to determine the size and shape of the leg openings.

It will be observed from a consideration of Figs. 2 and 3 that the aforesaid pads 4 are disposed on both front and rear surfaces of the form F. On one of these surfaces, the pads 4 have duplicate configurations and the same holds true with respect to the pads 4 on the opposite form surface. However, on the opposite respective surfaces, the pad configurations are different.

After the form F has been dipped as described above to deposit the latex film $f$ thereon and with the latter dry and substantially unvulcanized, a latex foam layer $e$ is applied to the front surface thereof, a latex foam layer $e1$ is applied to the rear surface thereof and, if desired, latex foam layers $e2$ are applied to the respective surfaces thereof which engage the curved sides of the form F, respectively. When the latex foam layers $e$, $e1$ and $e2$ are thus applied to the latex film $f$, they are substantially tacky and they may be substantially unvulcanized or not completely vulcanized.

The latex foam layers $e$ are of duplicate configurations and each of them comprises duplicate cut out portions or recesses $r$. Accordingly, when a latex foam layer $e$ is applied to that section of the latex film $f$ which engages the uppermost surface of the form, Fig. 2, the respective pads 4 thereon are received by the recesses $r$. Otherwise, the latex foam layer $e$ which is thus applied is so shaped that it precisely covers the aforesaid latex film section.

After completion of the foregoing, the form F is turned over and positioned as shown in Fig. 3. Thereupon, one of the substantially tacky, substantially unvulcanized latex foam layers $e1$, which are of duplicate configurations, is applied to that section of the latex film $f$ which engages the now uppermost form surface, said last named latex foam layer being so shaped that it precisely covers the latex film section last named. Each latex foam layer $e1$ comprises duplicate recesses $r1$ and, when the latex foam layer $e1$ is thus upplied, the respective pads 4 on said last named form surface are received in the recesses $r1$.

At this stage, the form F may be positioned as shown in Fig. 4 and one of the substantially tacky, substantially unvulcanized latex foam layers $e2$, which are of duplicate configurations, is applied to the now uppermost curved edge of said form. Thereupon, the position of the form may be reversed and another latex foam layer $e2$ having the characteristics described above as regards the latex foam layer $e2$ is applied to the other curved edge of the form. It will be understood that the layers $e2$ are so shaped that they precisely cover the opposite respective edges of the form.

After completion of the foregoing, the latex film $f$, while on the form F, and the attached latex foam layers are vulcanized or cured as a unit to thereby adhesively unite the foam layers to the latex film. Thereafter, the girdle is stripped from the form F, and, ordinarily, is turned inside out before it is worn. When thus worn, the exterior, irregular, sponge-like surface of the latex foam coating formed by the previously applied latex foam layers $e$, $e1$, $e2$ and $e2$ directly engages the skin of the wearer, this being advantageous and desirable for known reasons.

The hereinbefore described latex foam layers are stretchable or deformable to some extent and, hence, each of the layers $e$ and $e1$, as they are applied on the latex film $f$ in the manner described above, may be stretched in a direction transversely of the form so as to obtain sufficient material to be folded around the curved form edges. If this procedure is adopted, no need arises for utilization of the latex foam layers $e2$, $e2$. At the extreme crotch of the girdle, a preformed latex foam layer may be applied to the latex film section in engagement with the top form surface which is transversely disposed between the form pads 4. Or, if desired, the latex foam layers $e$, $e1$ may be stretched longitudinally of the form in order to cover this part of the girdle crotch.

It shall be understood that the invention is not to be limited to the method described above for obtaining a latex foam coating or covering on the latex film $f$. Thus, for example, the latex foam layers $e$, $e1$, $e2$ and $e2$, if the latter are used, together with the latex film $f$ may be vulcanized prior to application of the latex foam layers to the latex film $f$. Thereafter, after appropriate adhesive has been applied either to the latex film $f$, to the latex foam layers, or to both the latex film and the layers, the latter are positioned on and secured to said latex film $f$ to thereby produce the described article. Alternatively, the latex film $f$ may be stripped from the form and, while dry and substantially unvulcanized, the substantially tacky and substantially unvulcanized latex foam layers may be applied thereto. Or, after the latex film $f$ has been stripped from the form, it may be vulcanized, whereupon the vulcanized latex foam layers may be adhesively secured thereto.

I have also found that I can take a cured or vulcanized sheet of foam of desired thickness and apply it to an uncured (unvulcanized), dipped sheet of impervious latex, using a curing cement between the two to effect a permanently bonded relation between both layers, the "curing" of the cement taking place while the bonded layers are being subjected to final suitable vulcanizing treatment.

As hereinbefore stated, various rubber or latex articles other than girdles may be produced by the method herein described. When such other articles are produced, it will be understood that the respective latex foam layers which are used in lieu of the latex foam layers $e$, $e1$ and $e2$ will be so shaped that they may be precisely fitted to those surfaces of the latex film with which they are to be united.

While the invention has been described with respect to certain particular preferred examples which give satisfactory results, it will be understood by those skilled in the art after understanding the invention, that various changes and modifications may be made without departing from the spirit and scope of the invention and it is intended therefore in the appended claims to cover all such changes and modifications.

What is claimed as new and desired to be secured by Letters Patent, is:

1. In the art of making a latex article, the steps which consist in depositing a latex film on a form which has at least one surface carrying a pair of pads over which the latex film extends, and applying a single preformed layer of latex foam to the latex film engaging said one surface, the layer of latex foam being provided with recesses in which the respective pads are received.

2. In the art of making a latex article, the steps which consist in depositing on a form a latex film which has sections engaging, respectively, the front pad-carrying, the rear pad-carrying and side surfaces of the form, and successively applying a single layer of latex foam on each of the latex film sections, the respective layers of latex foam for the latex film sections in engagement with the front and rear form surfaces being provided with recesses in which the respective pads are received.

3. In the art of making a latex article, the steps which consist in depositing a latex film on a form which has at least one surface provided with a pair of defining areas over which the latex film extends, and applying a single preformed layer of latex foam to the latex film engaging said one surface, the layer of latex foam being provided with cut out portions conforming to said defining areas.

4. In the art of making a latex article, the steps which consist in depositing on a form a latex film which has sections engaging, respectively, the front and rear surfaces provided with defining areas and side surfaces of the form, and successively applying a single layer of latex foam on each of the latex film sections, the respective layers of latex foam for the latex film sections in engagement with the front and rear form surfaces being provided with cut out portions conforming to said defining areas.

ABRAHAM N. SPANEL.

REFERENCES CITED

The following references are of record in the file of this patent:

UNITED STATES PATENTS

| Number | Name | Date |
|---|---|---|
| 399,940 | Slazenger | Mar. 19, 1889 |
| 1,274,091 | Seward | July 30, 1918 |
| 1,945,055 | Madge | Jan. 30, 1934 |
| 2,121,678 | Armor | June 21, 1938 |
| 2,170,947 | Habgood et al. | Aug. 29, 1939 |
| 2,324,735 | Spanel | July 20, 1943 |

FOREIGN PATENTS

| Number | Country | Date |
|---|---|---|
| 840,182 | France | Apr. 20, 1939 |